US010005923B2

(12) United States Patent
Klein et al.

(10) Patent No.: US 10,005,923 B2
(45) Date of Patent: Jun. 26, 2018

(54) COATING MATERIAL COMPOSITIONS AND COATINGS PRODUCED THEREFROM, AND USE THEREOF

(71) Applicant: BASF Coatings GmbH, Muenster (DE)

(72) Inventors: Guenter Klein, Muenster (DE); Ulrike Wenking, Steinfurt-Borghorst (DE); Christian Weiher, Muenster (DE); Peter Hoffmann, Senden (DE); Melanie Werner, Billerbeck (DE)

(73) Assignee: BASF Coatings GmbH, Muenster (DE)

( * ) Notice: Subject to any disclaimer, the term of this patent is extended or adjusted under 35 U.S.C. 154(b) by 0 days. days.

(21) Appl. No.: 15/120,273

(22) PCT Filed: Dec. 11, 2014

(86) PCT No.: PCT/EP2014/077402
§ 371 (c)(1),
(2) Date: Aug. 19, 2016

(87) PCT Pub. No.: WO2015/124231
PCT Pub. Date: Aug. 27, 2015

(65) Prior Publication Data
US 2017/0066943 A1 Mar. 9, 2017

(30) Foreign Application Priority Data

Feb. 20, 2014 (EP) ..................................... 14155867

(51) Int. Cl.
*C09D 175/04* (2006.01)
*B05D 7/00* (2006.01)
*C08G 18/62* (2006.01)
*B05D 1/02* (2006.01)
*C08G 18/75* (2006.01)
*C08G 18/73* (2006.01)
*C08G 18/40* (2006.01)
*C08G 18/42* (2006.01)

(52) U.S. Cl.
CPC ............ *C09D 175/04* (2013.01); *B05D 1/02* (2013.01); *B05D 7/57* (2013.01); *C08G 18/4063* (2013.01); *C08G 18/4252* (2013.01); *C08G 18/6225* (2013.01); *C08G 18/73* (2013.01); *C08G 18/755* (2013.01)

(58) Field of Classification Search
CPC ............ C08G 18/4063; C08G 18/4252; C08G 18/6225; C08G 18/72; C08G 18/73; C08G 18/755; C09D 175/04; B05D 1/02; B05D 7/57; Y10T 428/31551
USPC ........... 428/423.1, 424.7, 424.8; 528/65, 66; 427/379
See application file for complete search history.

(56) References Cited

U.S. PATENT DOCUMENTS

| 4,264,743 A * | 4/1981 | Maruyama ............. C08G 18/36 521/101 |
| 4,598,131 A | 7/1986 | Prucnal |
| 4,710,542 A | 12/1987 | Forgione et al. |
| 5,102,961 A | 4/1992 | Blank |
| 5,663,233 A | 9/1997 | Bederke et al. |
| 5,817,733 A * | 10/1998 | Rink ...................... B05D 5/005 427/407.1 |
| 6,433,073 B1 | 8/2002 | Kantner et al. |
| 6,448,326 B1 * | 9/2002 | Mayer ................ C08G 18/0823 524/502 |
| 9,868,134 B2 * | 1/2018 | Steinmetz ................ B05D 1/04 |
| 2004/0161538 A1 * | 8/2004 | Boehme ................ C08F 283/02 427/372.2 |
| 2011/0020554 A1 * | 1/2011 | Dahm .................. C08G 18/281 427/385.5 |

FOREIGN PATENT DOCUMENTS

| DE | 1 198 348 | 6/1961 |
| DE | 1 768 313 | 4/1971 |
| DE | 2 234 265 | 2/1973 |
| DE | 696 11 164 T2 | 8/2001 |
| EP | 0 245 700 B1 | 11/1987 |
| EP | 0 688 840 A2 | 12/1995 |
| EP | 0 692 007 | 1/1996 |
| EP | 0 994 117 A1 | 4/2000 |
| EP | 1 273 640 A2 | 1/2003 |
| EP | 1 664 222 B1 | 1/2012 |
| EP | 2 840 101 A1 | 2/2015 |
| EP | 2 843 017 A1 | 3/2015 |
| EP | 2 851 379 A1 | 3/2015 |
| WO | 91/13918 A1 | 9/1991 |
| WO | 94/22969 A1 | 10/1994 |
| WO | 97/03102 A1 | 1/1997 |
| WO | 01/09260 A1 | 2/2001 |

(Continued)

OTHER PUBLICATIONS

International Search Report dated Apr. 1, 2015 in PCT/EP2014/077402, filed Dec. 11, 2014.

*Primary Examiner* — Thao T Tran
(74) *Attorney, Agent, or Firm* — Oblon, McClelland, Maier & Neustadt, L.L.P.

(57) ABSTRACT

The present invention relates to a nonaqueous coating material composition comprising
(A) at least one polyhydroxyl group-containing component (A) and
(B) at least one polyisocyanate group-containing component (B),
wherein the composition comprises at least one reaction product (RP) having an acid number <20 mg KOH/g and preparable by reaction of at least one dimer fatty acid (a) with at least one aliphatic, araliphatic, or aromatic dihydroxy-functional compound (b), the compound (b) having a number-average molecular weight of 120 to 6000 g/mol.
The present invention further provides the coatings produced from these coating material compositions, and also the use of said coatings.

19 Claims, No Drawings

(56) References Cited

FOREIGN PATENT DOCUMENTS

| WO | 02/10243 A1 | 2/2002 | |
|---|---|---|---|
| WO | 2006/042585 A1 | 4/2006 | |
| WO | 2007/137632 A1 | 12/2007 | |
| WO | WO 2008127926 A1 * | 10/2008 | ............ C08G 18/10 |
| WO | 2009/094332 A2 | 7/2009 | |
| WO | 2012/123161 A1 | 9/2012 | |
| WO | 2012/123166 A1 | 9/2012 | |
| WO | 2012/123198 A1 | 9/2012 | |
| WO | 2012/126796 A1 | 9/2012 | |
| WO | 2013/110712 A1 | 8/2013 | |
| WO | 2014/033135 A2 | 3/2014 | |

* cited by examiner

US 10,005,923 B2

COATING MATERIAL COMPOSITIONS AND COATINGS PRODUCED THEREFROM, AND USE THEREOF

The present invention relates to nonaqueous coating material compositions comprising at least one polyhydroxyl group-containing component (A) and at least one polyisocyanate group-containing component (B). The present invention further provides the coatings produced from these coating material compositions, and also the use thereof, more particularly for automotive OEM finishing, automotive refinish, and the coating of parts for installation in or on vehicles, and also of plastics.

In a typical multicoat paint system in automotive OEM finishing, a substrate coated with an electrodeposition coating system is coated further with a surfacer coat, a basecoat, and a clearcoat. Clearcoat materials used may be 2-component (2K) clearcoat materials, for example. A clearcoat is a coating material which, after application and curing, forms a transparent coating (the clearcoat) having protective and/or decorative properties. Protective properties are, for example, scratch resistance and weathering resistance, especially UV resistance. A decorative property is, for example, good gloss. In automotive OEM finishing there may be overbaking of the resultant multicoat paint system. The term "overbaking" refers to the alteration of the surface of the finish as a result of local overheating. Overbaking results in a deterioration, in particular, in the adhesion properties of the resulting clearcoat surface, which affects, for example, refinishing or window bonding.

The adhesion of the clearcoat film is often improved by the addition of appropriate additives, more particularly silane-based additives. For instance, WO 07/137632 discloses improving the adhesion, more particularly for the window bonding of automotive clearcoat materials, by addition of silanized isocyanates as adhesion promoters and of diphosphonic diesters as catalysts.

Furthermore, EP-B-1 664 222 discloses the addition of fluorinated urethane additives for improving the adhesion of coating materials.

Furthermore, WO 97/03102 discloses coating materials which comprise at least one hydroxy-functional poly(meth)acrylate resin, at least one hydroxy-functional polyester, at least one blocked isocyanate, and at least one triazine-based crosslinking agent. The polyesters there are composed of polycarboxylic acids, alcohols with a hydricity of three and/or more, and also, optionally, further synthesis components. In that case it is essential that the poly(meth)acrylate is prepared at least partly in the presence of the polyester. The coatings produced from these coating materials are notable for high acid resistance, high condensation resistance, and very good topcoat holdout. Indications of how the adhesion of the coatings may be improved, however, are absent from that specification.

The as yet unpublished European patent applications with the filing numbers EP 13181559.9, EP 13181764.5, EP 13182100.1, and EP 13182101.9, and the International patent application PCT/EP2013/067742, describe aqueous pigmented coating material compositions which for the purpose of improving the adhesion comprise the reaction product of dimer fatty acids with polyether diols. The use of these reaction products in nonaqueous coating materials, however, is not described in those applications.

PROBLEM

The problem addressed for the present invention was therefore that of providing nonaqueous coating material compositions which lead to coatings, more particularly clearcoats, featuring improved adhesion. An improvement in the adhesion properties is to be achieved, especially after overbaking, for refinishing and for window bonding. At the same time, moreover, the basic formula of a conventional clearcoat system is to be modified as little as possible. Furthermore, the protective and decorative properties of the clearcoat shall be unaffected by the alteration.

SOLUTION TO THE PROBLEM

In the light of the above objective, a nonaqueous coating material composition has been found which comprises
(A) at least one polyhydroxyl group-containing component (A) and
(B) at least one polyisocyanate group-containing component (B)
and wherein
the coating material composition comprises at least one hydroxy-functional reaction product (RP) which is other than component (A) and which
(i) possesses an acid number <20 mg KOH/g and
(ii) is preparable by reaction of at least one dimer fatty acid
  (a) with at least one aliphatic, araliphatic, or aromatic dihydroxy-functional compound (b), the dihydroxy-functional compound (b) having a number-average molecular weight of 120 to 6000 g/mol.

Also provided with the present invention are multistage coating methods using these coating material compositions, and also the use of the coating material compositions as clearcoat or application of the coating method for automotive OEM finishing, for automotive refinish and/or for the coating of parts for installation on automobiles, of plastics substrates and/or of utility vehicles.

It has now, surprisingly, been found that the addition of the reaction products used in accordance with the invention significantly improves the adhesion of the clearcoat film, especially in the case of overbaking, without significant deterioration in the remaining, good properties of the coating, especially its micropenetration hardness.

Furthermore, the coating material compositions also meet the requirements typically imposed on the clearcoat film in automotive OEM finishing and automotive refinish. Lastly, the coating material compositions can be produced easily and with very good reproducibility.

DESCRIPTION OF THE INVENTION

The Coating Materials of the Invention

For the purposes of the present invention, unless otherwise indicated, constant conditions were selected in each case for the determination of nonvolatile fractions (NVF, solids). To determine the nonvolatile fraction, an amount of 1 g of the respective sample is applied to a solid lid and heated at 130° C. for 1 h, then cooled to room temperature and weighed again (in accordance with ISO 3251). Determinations were made of the nonvolatile fraction of, for example, corresponding polymer solutions and/or resins present in the coating composition of the invention, in order thereby to adjust the weight fraction of the respective constituent in a mixture of two or more constituents, or of the overall coating composition, and allow it to be determined.

The binder fraction (also called nonvolatile fraction or solids content) of the individual components (A) or (B) or (C) or (RP) or (E) of the coating material is therefore determined by weighing out a small sample of the respective component (A) or (B) or (C) or (RP) or (E) and subsequently determining the solids by drying it at 130° C. for 60 minutes, cooling it, and then weighing it again. The binder fraction of the component in wt % is then given, accordingly, by 100 multiplied by the ratio of the weight of the residue of the respective sample after drying at 130° C., divided by the weight of the respective sample prior to drying.

In the case of standard commercial components, the binder fraction of said component may also be equated with sufficient accuracy with the stated solids content, unless otherwise indicated.

The binder fraction of the coating material composition is determined arithmetically from the sum of the binder fractions of the individual binder components and crosslinker components (A), (B), (C), (RP), and (E) of the coating material.

For the purposes of the invention, the hydroxyl number or OH number indicates the amount of potassium hydroxide, in milligrams, which is equivalent to the molar amount of acetic acid bound during the acetylation of one gram of the constituent in question. For the purposes of the present invention, unless otherwise indicated, the hydroxyl number is determined experimentally by titration in accordance with DIN 53240-2 (Determination of hydroxyl value—Part 2: Method with catalyst).

For the purposes of the invention, the acid number indicates the amount of potassium hydroxide, in milligrams, which is needed to neutralize 1 g of the respective constituent. For the purposes of the present invention, unless otherwise indicated, the acid number is determined experimentally by titration in accordance with DIN EN ISO 2114.

The mass-average (Mw) and number-average (Mn) molecular weight is determined for the purposes of the present invention by means of gel permeation chromatography at 35° C., using a high-performance liquid chromatography pump and a refractive index detector. The eluent used was tetrahydrofuran containing 0.1 vol % acetic acid, with an elution rate of 1 ml/min. The calibration is carried out by means of polystyrene standards.

For the purposes of the invention, the glass transition temperature Tg is determined experimentally on the basis of DIN 51005 "Thermal Analysis (TA)—Terms" and DIN 53765 "Thermal Analysis—Differential Scanning calorimetry (DSC)". This involves weighing out a 10 mg sample into a sample boat and introducing it into a DSC instrument. The instrument is cooled to the start temperature, after which a $1^{st}$ and $2^{nd}$ measurement run is carried out under inert gas flushing ($N_2$) at 50 ml/min with a heating rate of 10 K/min, with cooling to the start temperature again between the measurement runs. Measurement takes place typically in the temperature range from about 50° C. lower than the expected glass transition temperature to about 50° C. higher than the glass transition temperature. The glass transition temperature recorded for the purposes of the present invention, in line with DIN 53765, section 8.1, is the temperature in the $2^{nd}$ measurement run at which half of the change in the specific heat capacity (0.5 delta cp) is reached. This temperature is determined from the DSC plot (plot of the thermal flow against the temperature), and is the temperature at the point of intersection of the midline between the extrapolated baselines, before and after the glass transition, with the measurement plot.

The Polyhydroxyl Group-Containing Component (A)

As polyhydroxyl group-containing component (A) it is possible to use all compounds known to the skilled person which have at least 2 hydroxyl groups per molecule and are oligomeric and/or polymeric. As component (A) it is also possible to use mixtures of different oligomeric and/or polymeric polyols.

The preferred oligomeric and/or polymeric polyols (A) have number-average molecular weights Mn>=300 g/mol, preferably Mn=400-30 000 g/mol, more preferably Mn=500-15 000 g/mol, and mass-average molecular weights Mw>500 g/mol, preferably between 800 and 100 000 g/mol, more particularly between 900 and 50 000 g/mol, measured by means of gel permeation chromatography (GPC) against a polystyrene standard.

Preferred as component (A) are polyester polyols, polyacrylate polyols and/or polymethacrylate polyols, and also copolymers thereof—referred to hereinafter as polyacrylate polyols; polyurethane polyols, polysiloxane polyols, and mixtures of these polyols.

The polyols (A) preferably have an OH number of 30 to 400 mg KOH/g, more particularly between 70 and 250 mg KOH/g. In the case of the poly(meth)acrylate copolymers, the OH number may also be determined with sufficient precision by calculation on the basis of the OH-functional monomers employed.

The polyols (A) preferably have an acid number of between 0 and 30 mg KOH/g.

The glass transition temperatures, measured by means of DSC measurements in accordance with DIN-EN-ISO 11357-2, of the polyols are preferably between −150 and 100° C., more preferably between −120° C. and 80° C.

Polyurethane polyols are prepared preferably by reaction of oligomeric polyols, more particularly of polyester polyol prepolymers, with suitable di- or polyisocyanates, and are described in EP-A-1 273 640, for example. Use is made more particularly of reaction products of polyester polyols with aliphatic and/or cycloaliphatic di- and/or polyisocyanates.

The polyurethane polyols used with preference in accordance with the invention have a number-average molecular weight Mn>=300 g/mol, preferably Mn=700-2000 g/mol, more preferably Mn=700-1300 g/mol, and also preferably a mass-average molecular weight Mw>500 g/mol, preferably between 1500 and 3000 g/mol, more particularly between 1500 and 2700 g/mol, in each case measured by means of gel permeation chromatography (GPC) against a polystyrene standard.

Suitable polysiloxane polyols are described in WO-A-01/09260, for example, and the polysiloxane polyols recited therein can be employed preferably in combination with further polyols, more particularly those having higher glass transition temperatures.

As polyhydroxyl group-containing component (A), use is made with particular preference of polyester polyols, polyacrylate polyols, polymethacrylate polyols, and polyurethane polyols, all different from the reaction product (RP), or mixtures thereof, and very preferably of mixtures of poly(meth)acrylate polyols.

The polyester polyols (A) used with preference in accordance with the invention have a number-average molecular weight Mn>=300 g/mol, preferably Mn=400-10 000 g/mol, more preferably Mn=500-5000 g/mol, and also preferably a mass-average molecular weight Mw>500 g/mol, preferably between 800 and 50 000 g/mol, more particularly between 900 and 10 000 g/mol, in each case measured by means of gel permeation chromatography (GPC) against a polystyrene standard.

The polyester polyols (A) used with preference in accordance with the invention preferably have an OH number of 30 to 400 mg KOH/g, more particularly between 100 and 250 mg KOH/g.

The polyester polyols (A) used with preference in accordance with the invention preferably have an acid number of between 0 and 30 mg KOH/g.

Suitable polyester polyols are also described in EP-A-0 994 117 and EP-A-1 273 640, for example.

The poly(meth)acrylate polyols (A) used with preference in accordance with the invention are generally copolymers and preferably have a number-average molecular weight Mn>=300 g/mol, preferably Mn=500-15 000 g/mol, more preferably Mn=900-10 000 g/mol, and also, preferably, mass-average molecular weights Mw between 500 and 20 000 g/mol, more particularly between 1000 and 15 000 g/mol, measured in each case by means of gel permeation chromatography (GPC) against a polystyrene standard.

The glass transition temperature of the copolymers is generally between −100 and 100° C., more particularly between −60 and <50° C. (measured by means of DSC measurements in accordance with DIN-EN-ISO 11357-2).

The poly(meth)acrylate polyols (A) preferably have an OH number of 60 to 300 mg KOH/g, more particularly between 70 and 250 mg KOH/g, and an acid number of between 0 and 30 mg KOH/g.

The hydroxyl number (OH number) and the acid number are determined as described above (DIN 53240-2 and DIN EN ISO 2114, respectively).

Hydroxyl group-containing monomer building blocks used are preferably hydroxyalkyl acrylates and/or hydroxyalkyl methacrylates, such as, more particularly, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, and also, in particular, 4-hydroxybutyl acrylate and/or 4-hydroxybutyl methacrylate.

Further monomer building blocks used for the poly(meth)acrylate polyols are preferably alkyl acrylates and/or alkyl methacrylates, such as, preferably, ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, tert-butyl acrylate, tert-butyl methacrylate, amyl acrylate, amyl methacrylate, hexyl acrylate, hexyl methacrylate, ethylhexyl acrylate, ethylhexyl methacrylate, 3,3,5-trimethylhexyl acrylate, 3,3,5-trimethylhexyl methacrylate, stearyl acrylate, stearyl methacrylate, lauryl acrylate or lauryl methacrylate, cycloalkyl acrylates and/or cycloalkyl methacrylates, such as cyclopentyl acrylate, cyclopentyl methacrylate, isobornyl acrylate, isobornyl methacrylate, or, in particular, cyclohexyl acrylate and/or cyclohexyl methacrylate.

As further monomer building blocks for the poly(meth)acrylate polyols it is possible to use vinylaromatic hydrocarbons, such as vinyltoluene, alpha-methylstyrene, or, in particular, styrene, amides or nitriles of acrylic or methacrylic acid, vinyl esters or vinyl ethers, and also, in minor amounts, in particular, acrylic acid and/or methacrylic acid.

The Polyisocyanate Group-Containing Component (B)

Suitability as component (B) is possessed by conventional substituted or unsubstituted, aromatic, aliphatic, cycloaliphatic and/or heterocyclic polyisocyanates. Examples of preferred polyisocyanates are the following: toluene 2,4-diisocyanate, toluene 2,6-diisocyanate, diphenylmethane 4,4′-diisocyanate, diphenylmethane 2,4′-diisocyanate, p-phenylene diisocyanate, biphenyl diisocyanates, 3,3′-dimethyl-4,4′-diphenylene diisocyanate, tetramethylene 1,4-diisocyanate, hexamethylene 1,6-diisocyanate, 2,2,4-trimethylhexane 1,6-diisocyanate, isophorone diisocyanate, ethylene diisocyanate, dodecane 1,12-diisocyanate, cyclobutane 1,3-diisocyanate, cyclohexane 1,3-diisocyanate, cyclohexane 1,4-diisocyanate, methylcyclohexyl diisocyanates, hexahydrotoluene 2,4-diisocyanate, hexahydrotoluene 2,6-diisocyanate, hexahydrophenylene 1,3-diisocyanate, hexahydrophenylene 1,4-diisocyanate, perhydrodiphenylmethane 2,4′-diisocyanate, 4,4′-methylenedicyclohexyl diisocyanate (e.g., Desmodur® W from Bayer AG), tetramethylxylyl diisocyanates (e.g., TMXDI® from American Cyanamid), and mixtures of the aforementioned polyisocyanates. Preferred polyisocyanates are also the biuret dimers and the isocyanurate trimers of the aforementioned diisocyanates. Particularly preferred polyisocyanates (B) are hexamethylene 1,6-diisocyanate, isophorone diisocyanate, and 4,4′-methylenedicyclohexyl diisocyanate, their biuret dimmers and/or their isocyanurate trimers, and/or the asymmetric trimers thereof, such as, for example, the asymmetric HDI trimer available commercially under the name Desmodur® N3900.

In a further embodiment of the invention, suitability as component (B) is possessed by polyisocyanate prepolymers having urethane structural units, which are obtained by reaction of polyols with a stoichiometric excess of aforementioned polyisocyanates. Such polyisocyanate prepolymers are described in U.S. Pat. No. 4,598,131, for example.

Component (B) may be present in a suitable solvent (L). Suitable solvents (L) are those which permit sufficient solubility of the polyisocyanate component and are free from groups reactive toward isocyanates. Examples of such solvents are acetone, methyl ethyl ketone, cyclohexanone, methyl isobutyl ketone, methyl isoamyl ketone, diisobutyl ketone, ethyl acetate, n-butyl acetate, ethylene glycol diacetate, butyrolactone, diethyl carbonate, propylene carbonate, ethylene carbonate, N,N-dimethylformamide, N,N-dimethyl-acetamide, N-methylpyrrolidone, N-ethylpyrrolidone, methylal, butylal, 1,3-dioxolane, glycerol formal, benzene, toluene, xylene, n-hexane, cyclohexane, Solventnaphtha®, 2-methoxypropyl acetate (MPA), and ethyl ethoxypropionate.

The Hydroxyl Group-Containing Component (C)

Apart from the polyhydroxyl group-containing component (A) and apart from the hydroxyl group-containing reaction product (RP), the coating material compositions of the invention may optionally further comprise one or more monomeric, hydroxyl group-containing components (C) that are different from component (A) and from the reaction product (RP). These components (C) preferably account for a fraction of 0 to 10 wt %, more preferably of 0 to 5 wt %, based in each case on the binder fraction of the coating material composition (in other words based in each case on the total of the binder fraction of the component (A) plus the binder fraction of the component (B) plus the binder fraction of component (C) plus the binder fraction of the component (RP) plus the binder fraction of the component (E)).

Low molecular mass polyols are employed as hydroxyl group-containing component (C).

Low molecular mass polyols used are, for example, diols, such as preferably ethylene glycol, di- and tri-ethylene glycol, neopentyl glycol, 1,2-propanediol, 2,2-dimethyl-1,3-propanediol, 1,4-butanediol, 1,3-butanediol, 1,5-pentanediol, 2,2,4-trimethyl-1,3-pentanediol, 1,6-hexanediol, 1,4-cyclohexanedimethanol, and 1,2-cyclohexanedimethanol, and also polyols, such as preferably trimethylolethane, trimethylolpropane, trimethylolhexane, 1,2,4-butanetriol, pentaerythritol, and dipentaerythritol. Such low molecular mass polyols (C) are preferably admixed in minor fractions to the polyol component (A).

The Hydroxy-Functional Reaction Product (RP)

It is essential to the invention that the coating material composition comprises at least one hydroxy-functional reaction product (RP), preferably precisely one reaction product (RP), which is different from component (A) and from component (C).

The reaction products are substantially linear. Linear reaction products may be obtained in principle by the reaction of difunctional reactants, in which case a linear, in other words catenary, structure is formed by the linking of the reactants via reaction of the functional groups. Therefore, for example, when the reaction product is a polymer, the backbone has a linear character. The reaction product is more particularly a polyester, for which diols and dicarboxylic acids are employed as reactants, and then the sequence of ester bonds in the reaction product has a linear character. In the preparation of the reaction product (RP), therefore, primarily difunctional reactants are preferably used. Other reactants, accordingly, such as monofunctional compounds in particular, are preferably not used, or are used preferably only in minor amounts. More particularly at least 80 mol %, preferably at least 90 mol %, and very preferably exclusively difunctional reactants are used. If other reactants are employed, they are preferably selected exclusively from the group of monofunctional reactants. It is preferred, however, for exclusively difunctional reactants to be used.

The reaction product is hydroxy-functional. With preference the reactants are reacted such that resultant linear molecules have two terminal hydroxyl groups. This means that there is one hydroxyl group present at each of the two ends of these molecules.

The reaction product has an acid number of less than 20, preferably less than 15, especially preferably less than 10, and very preferably less than 5 mg KOH/g. The product therefore has preferably only a very small amount of carboxylic acid groups. In the context of the present invention, unless explicitly indicated otherwise, the acid number is determined in accordance with DIN 53402. It relates to the reaction product per se, in other words to the solids=nonvolatile fraction (for the determination of the solids, see above).

Any reference in the context of the present invention to an official standard without a reference to the official period of validity is, of course, to the version of the standard valid on the filing date, or, in the absence of a valid version at that date, to the last valid version.

The hydroxy functionality described, just like the low acid number, can be obtained in a manner known per se, for example, through the use of corresponding proportions of reactants having corresponding functional groups. In the present case, of preparation using dihydroxy-functional and dicarboxy-functional reactants, then, a corresponding excess of the dihydroxy-functional component is employed. In this connection, the following may be elucidated. For purely statistical reasons, of course, an actual reaction produces not only molecules having, for example, the desired (di)-hydroxy functionality. The choice of corresponding conditions, as for example an excess of dihydroxy-functional reactants, and conducting of the reaction until the desired acid number is obtained, nevertheless guarantees that the reaction products or molecules which constitute the reaction product will on average at any rate be hydroxy-functional. The skilled person knows how to select such conditions.

The number-average molecular weight of the reaction products may vary widely and is preferably from 600 to 40 000 g/mol, more particularly from 800 to 10 000 g/mol, very preferably from 1200 to 5000 g/mol. For the purposes of the present invention, unless explicitly indicated otherwise, the number-average molecular weight is determined by means of vapor pressure osmosis. A vapor pressure osmometer (model 10.00 from Knauer) was used to measure concentration series of the component under analysis, in toluene at 50° C., with benzophenone as calibration substance, for the purpose of determining the experimental calibration constant of the measuring instrument employed (according to E. Schröder, G. Müller, K.-F. Arndt, "Leitfaden der Polymercharakterisierung" [Principles of Polymer Characterization], Akademie-Verlag, Berlin, pp. 47-54, 1982, in which benzyl was the calibrating substance used).

The reaction products (RP) used in accordance with the invention are preparable by reaction of at least one dimer fatty acid (a) with at least one aliphatic, araliphatic, or aromatic dihydroxy-functional compound (b), with the dihydroxy-functional compound (b) having a number-average molecular weight of 120 to 6000 g/mol.

Dimer fatty acids (also long known as dimerized fatty acids or dimer acids) are—generally and especially in the context of the present invention—mixtures which are prepared by oligomerization of unsaturated fatty acids. They are preparable, for example, by catalytic dimerization of unsaturated vegetable fatty acids, the starting materials employed being, more particularly, unsaturated C12 to C22 fatty acids. Linking proceeds primarily in accordance with the Diels-Alder type, and the result, depending on number and position of the double bonds in the fatty acids used for preparing the dimer fatty acids, are mixtures of primarily dimeric products, which between the carboxyl groups have cycloaliphatic, linear-aliphatic, branched-aliphatic, and also C6-aromatic hydrocarbon groups. Depending on mechanism and/or optional subsequent hydrogenation, the aliphatic radicals may be saturated or unsaturated, and the fraction of aromatic groups may also vary. The radicals between the carboxylic acid groups then contain, for example, 24 to 44 carbon atoms. Fatty acids used preferably for the preparation have 18 carbon atoms, and so the dimeric product has 36 carbon atoms. The radicals which join the carboxyl groups in the dimer fatty acids preferably have no unsaturated bonds and no aromatic hydrocarbon radicals.

For the purposes of the present invention, therefore, preparation takes place preferably using $C_{18}$ fatty acids. Employed with particular preference are linolenic, linoleic and/or oleic acid.

Depending on the reaction regime, the products of the above-designated oligomerization are mixtures comprising primarily dimeric, but also trimeric molecules and also monomeric molecules, and other byproducts. Purification is typically by distillation. Commercial dimer fatty acids generally contain at least 80 wt % of dimeric molecules, up to 19 wt % of trimeric molecules, and not more than 1 wt % of monomeric molecules and other byproducts.

Dimer fatty acids (a) used with preference consist of at least 90 wt %, preferably at least 95 wt %, very preferably at least 98 wt % of dimeric fatty acid molecules.

For the purpose of the present invention it is preferred for the dimer fatty acid (a) used in preparing the reaction product (RP) to consist of at least 90 wt % of dimeric molecules, less than 5 wt % of trimeric molecules, and less than 5 wt % of monomeric molecules and other byproducts. Particular preference attaches to using dimer fatty acids which consist of 95 to 98 wt % of dimeric molecules, less than 5 wt % of trimeric molecules, and less than 1 wt % of monomeric molecules and other byproducts. Likewise particularly preferred is the use of dimer fatty acids consisting of at least 98 wt % of dimeric molecules, less than 1.5 wt % of trimeric molecules, and less than 0.5 wt % of monomeric molecules and other byproducts. Determining the proportions of monomeric, dimeric, and trimeric molecules and also of other byproducts in the dimer fatty acids can be accomplished, for example, using gas chromatography (GC). In that case, prior to the GC analysis, the dimer fatty acids are converted to the corresponding methyl esters by the boron trifluoride method (compare DIN EN ISO 5509) and then analyzed by means of GC.

A fundamental characteristic of "dimer fatty acids" in the context of the present invention, then, is that their preparation includes the oligomerization of unsaturated fatty acids. The principal products of this oligomerization—that is, preferably to an extent of at least 80 wt %, more preferably at least 90 wt %, very preferably at least 95 wt %, and more particularly at least 98 wt %—are dimeric products. The fact, then, that the oligomerization forms predominantly dimeric products which contain precisely two fatty acid molecules justifies this nomenclature, which is in any case commonplace. An alternative expression for the relevant term "dimer fatty acids" is therefore "mixture comprising dimerized fatty acids". Through the use of dimeric fatty acids, therefore, the use of difunctional compounds (a) is automatically realized. This also justifies the indication, selected in the context of the present invention, that dimer fatty acids are employed as compound (a). The reason is that compounds (a) are apparently the main constituent of the mixtures identified as dimer fatty acids. That dimer fatty acids are used as compounds (a) therefore means that these compounds (a) are employed in the form of corresponding mixtures having, as described above, monomeric and/or trimeric molecules and/or other byproducts.

In one particularly preferred embodiment of the reaction product (RP) used in accordance with the invention, the dimer fatty acid (a) is prepared from linolenic, linoleic and/or oleic acid and/or consists to an extent of at least 98 wt % of dimeric molecules, less than 1.5 wt % of trimeric molecules, and less than 0.5 wt % of monomeric molecules and other byproducts, and possesses an iodine number of 10 g/100 g.

The dimer fatty acids for use can be obtained as commercial products. Citable examples include Radiacid 0970, Radiacid 0971, Radiacid 0972, Radiacid 0975, Radiacid 0976, and Radiacid 0977 from Oleon, Pripol 1006, Pripol 1009, Pripol 1012, and Pripol 1013 from Croda, Empol 1008, Empol 1061, and Empol 1062 from BASF, and also Unidyme 10 and Unidyme TI from Arizona Chemical.

Preferred reaction products (RP) are preparable by reaction of dimer fatty acids with aliphatic, araliphatic or aromatic dihydroxy-functional compounds (b). Aliphatic compounds are organic compounds which are not aromatic. They may be linear, cyclic, or branched. Possible, for example, are compounds which consist of two hydroxyl groups and one aliphatic hydrocarbon radical. Also possible are compounds which besides the oxygen atoms present in the two hydroxyl groups contain further heteroatoms such as oxygen or nitrogen, more particularly oxygen, in the form of linking ether bonds and/or ester bonds, for example. Araliphatic compounds are those which contain both aliphatic and aromatic structural units. It is preferred, however, for the reaction products (RP) to be prepared by reaction of dimer fatty acids with aliphatic dihydroxy-functional compounds (b).

The aliphatic, araliphatic or aromatic dihydroxy-functional compounds (b) have a number-average molecular weight of 120 to 6000 g/mol, more particularly of 200 to 4500 g/mol.

The statement of a number-average molecular weight therefore implies that the preferred dihydroxy-functional compounds are mixtures of dihydroxy-functional molecules of different sizes.

Preference in accordance with the invention is also given to using reaction products (RP) for which the components (a) and (b) are used in a molar ratio of 0.7/2.3 to 1.6/1.7, more preferably of 0.8/2.2 to 1.6/1.8, and very preferably of 0.9/2.1 to 1.5/1.8. The excess of hydroxyl groups therefore produces hydroxy-functional reaction products which also have a low acid number. The molecular weight of the reaction product can be controlled through the level of excess. If only a small excess of the hydroxy-functional reactant is employed, the resulting products are more long-chain, correspondingly, since only in that case is complete or near-complete reaction of the acid groups present guaranteed. In the case of a higher excess of the hydroxy-functional reactant, shorter-chain reaction products are formed accordingly. The number-average molecular weight of the reaction products is of course also influenced by the molecular weight of the reactants, such as of the preferably aliphatic dihydroxy-functional compounds, for example. The number-average molecular weight of the preferred reaction products may vary widely and is preferably from 600 to 40 000 g/mol, more particularly from 800 to 10 000 g/mol, very preferably from 1200 to 5000 g/mol.

The preferred reaction products can therefore also be described as linear blocklike compounds B-(A-B)n. The blocks A are based on dimer fatty acids, and the blocks B are based on aliphatic dihydroxy-functional compounds.

The dihydroxy-functional compounds (b) are preferably selected from the group consisting of
(1) at least one polyether diol (b1) of the general structural formula (I)

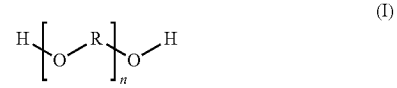

where R is a $C_3$ to $C_6$ alkylene radical and n correspondingly is selected such that the polyether diol (b1) possesses a number-average molecular weight of 120 to 6000 g/mol, and/or
(2) at least one polyester diol (b2) of the general structural formula (II)

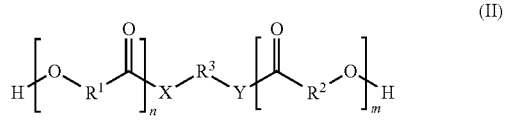

where
$R^3$ is a divalent organic radical comprising 2 to 10 carbon atoms,
$R^1$ and $R^2$ independently of one another are straight-chain or branched alkylene radicals having 2 to 10 carbon atoms, X and Y independently of one another are O, S, or $NR^4$, in which $R^4$ is hydrogen or an alkyl radical having 1 to 6 carbon atoms, and m and n correspondingly are selected such that the polyester diol (b2) possesses a number-average molecular weight of 450 to 2200 g/mol, and/or (3) at least one dimer diol (b3).

The preparation of the reaction product (RP) used in accordance with the invention has no peculiarities. The esterification takes place typically with the aid of a water separator. The reaction is discontinued when the reaction product possesses the desired acid number of <20 mg KOH/g.

Particular preference is given in accordance with the invention to using reaction products (RP) which are preparable by reaction of at least one dimer fatty acid (a) with at least one polyether diol (b1) of the general structural formula (I).

In the polyether diol (b1), all n radicals R may be the same. It is also possible, however, for different kinds of radicals R to be present. Preferably all the radicals R are the same. n should be selected, accordingly, such that the polyether diol (b1) possesses a number-average molecular weight of 120 to 6000 g/mol.

R is preferably a $C_3$ or a $C_4$ alkylene radical. More particularly the group R according to the general structural formula (I) comprises propylene radicals or isopropylene radicals or tetramethylene radicals, more particularly tetramethylene radicals.

Especial preference is given in accordance with the invention to using reaction products (RP) which possess an acid number <10 mg KOH/g and a number-average molecular weight of 1500 to 5000 g/mol, preferably 2000 to 4500 g/mol, and more preferably of 2500 to 4000 g/mol, and are preparable by reaction of at least one dimer fatty acid (a) with at least one polyether diol (b1) of the general structural formula (I), with the polyether diol (b1) possessing a number-average molecular weight of 450 to 2200 g/mol. With particular preference the polyether diol (b1) possesses a number-average molecular weight of 700 to 1400 g/mol, and very preferably of 800 to 1200 g/mol. The number-average molecular weight is measured by means of gel permeation chromatography against a polymethyl methacrylate standard; eluent: tetrahydrofuran. In this case the components (a) and (b1) are used in particular at a molar ratio of 0.7/2.3 to 1.3/1.7, preferably 0.9/2.1 to 1.1/1.9. These reaction products are described in the International patent application PCT/EP2013/067742, which is not a prior publication.

In this preferred embodiment, in particular, polyether diols (b1) are used for which the group R in accordance with the general structural formula (I) comprises propylene radicals or isopropylene radicals or tetramethylene radicals, more particularly tetramethylene radicals.

Especially preferred in accordance with the invention is the use in the coating material compositions of reaction products (RP) which possess a number-average molecular weight of 2500 to 4000 g/mol and an acid number <5 mg KOH/g and which are preparable by reaction of at least one dimer fatty acid (a) with at least one polyether diol (b1) of the general structural formula (I), where the polyether diol (b1) possesses a number-average molecular weight of 800 to 1200 g/mol and components (a) and (b1) are used in a molar ratio of 0.9/2.1 to 1.1/1.9.

In the coating material compositions, moreover, reaction products (RP) are preferably used that are preparable by reaction of at least one dimer fatty acid (a) with at least one polyether diol (b1) of the general structural formula (I), the polyether diol (b1) possessing a number-average molecular weight of 2250 to 6000 g/mol, more particularly of 2500 to 4800 g/mol, with components (a) and (b1) being employed in a molar ratio of 0.7/2.3 to 1.6/1.7, more particularly of 0.9/2.1 to 1.5/1.8, and the reaction product (RP) having a number-average molecular weight of 4800 to 40 000 g/mol, more particularly of 5000 to 30 000 g/mol, and preferably possessing an acid number <10 mg KOH/g. These reaction products are described in European patent application EP13181764.5, which was not a prior publication.

Likewise preferred in the coating material compositions is the use of reaction products (RP) which are preparable by reaction of at least one dimer fatty acid (a) with at least one polyether diol (b1) of the general structural formula (I), where the polyether diol (b1) possesses a number-average molecular weight of from 120 to 445 g/mol, more particularly from 170 to 350 g/mol, with components (a) and (b1) being employed in a molar ratio of 0.7/2.3 to 1.6/1.7, more particularly of 0.9/2.1 to 1.5/1.8, and the reaction product (RP) possessing a number-average molecular weight of 600 to 4000 g/mol, more particularly of 800 to 3500 g/mol, and preferably an acid number <10 mg KOH/g. These reaction products are described in European patent application EP13185581.9, which was not a prior publication.

In the coating materials of the invention it is also possible as well to use reaction products (RP) which are preparable by reaction of at least one dimer fatty acid (a) with at least one polyester diol (b2) of the general structural formula (II), where $R^3$ is a divalent organic radical comprising 2 to 10 carbon atoms, $R^1$ and $R^2$ independently of one another are straight-chain or branched alkylene radicals having 2 to 10 carbon atoms, X and Y independently of one another are O, S, or $NR^4$, in which $R^4$ is hydrogen or an alkyl radical having 1 to 6 carbon atoms, and m and n are selected accordingly such that the polyester diol (b2) possesses a number-average molecular weight of 450 to 2200 g/mol, preferably of 500 to 1400 g/mol, and where components (a) and (b) are used in a molar ratio of 0.7/2.3 to 1.3/1.7, preferably of 0.9/2.1 to 1.1/1.9, and the resulting dimer fatty acid-polyester diol reaction product possesses a number-average molecular weight of 1200 to 5000 g/mol, preferably 1200 to 4500 g/mol, and preferably an acid number of less than 10 mg KOH/g.

Preferably $R^3$ is an organic radical comprising 2 to 10 carbon atoms and preferably 2 to 6 carbon atoms. The radical $R^3$ may be aliphatic, aromatic, or araliphatic, for example. Besides carbon atoms and hydrogen atoms, the radical $R^3$ may also include heteroatoms such as O or N, for example. It may be saturated or unsaturated. Preferably $R^3$ is an aliphatic radical having 2 to 10 carbon atoms, more preferably an aliphatic radical having 2 to 6 carbon atoms, and very preferably an aliphatic radical having 2 to 4 carbon atoms. The radical $R^3$ stands, for example, for $C_2H_4$, $C_3H_6$, $C_4H_8$, or $C_2H_4$—O—$C_2H_4$.

$R^1$ and $R^2$ stand independently of one another for straight-chain or branched alkylene radicals having 2 to 10 carbon atoms, preferably 2 to 6 carbon atoms, and more preferably 3 to 5 carbon atoms. These radicals preferably contain only carbon and hydrogen.

In the polyester diol (b2), all n radicals $R^1$ and all m radicals $R^2$ may be the same. It is again, however, also possible for different types of radicals $R^1$ and $R^2$ to be present in the polyester diol. Preferably all the radicals $R^1$ and $R^2$ are the same.

In the case of $R^1$ and $R^2$, the radicals in question are very preferably a $C_4$ or a $C_5$ alkylene radical, more particularly a tetramethylene or pentamethylene radical. In one especially preferred embodiment of the present invention, both radicals $R^1$ and $R^2$, are pentamethylene radicals.

Hydroxycarboxylic acids HO—R1-COOH and HO—R2-COOH used, or their lactones, are very preferably 5-hydroxypentanoic acid or delta-valerolactone, and 6-hydroxyhexanoic acid or epsilon-caprolactone. If the polyester diols for inventive use and the dimer fatty acid-polyester diol reaction products of the invention that are produced therefrom are to possess a particularly low crystallization propensity, then the use is advisable of mixtures of at least two different hydroxycarboxylic acids or the corresponding lactones.

X and Y, independently of one another, are O, S or $NR^4$, in which $R^4$ stands for hydrogen or an alkyl radical having 1 to 6 carbon atoms. Preferably X and Y independently of one another are O or $NR^4$, and more preferably they are, independently of one another, O and NH; especially preferably, X and Y are O.

The indices m and n are selected accordingly such that the polyester diol possesses a number-average molecular weight of 450 to 2200 g/mol, preferably 500 to 1400 g/mol, very preferably 500 to 1200 g/mol.

The polyester polyols of the general structural formula (II) can be prepared, in a first route, by employing compounds HX—R—YH as what are called starter compounds and polymerizing the hydroxy-terminated polyester chains onto the starter compound by ring-opening polymerization of lactones of the hydroxycarboxylic acids HO—$R^1$—COOH and HO—$R^2$—COOH. According to a second route, of course, it is also possible first to prepare alpha-hydroxy-gamma-carboxy-terminated polyesters, as for example by ring-opening polymerization of lactones of the hydroxycarboxylic acids HO—$R^1$—COOH and HO—$R^2$—COOH or by polycondensation of the hydroxycarboxylic acids HO—$R^1$—COOH and HO—$R^2$—COOH. The alpha-hydroxy-gamma-carboxy-terminated polyesters can then be reacted in turn with compounds HX—R—YH, by means of a condensation reaction, to give the polyester diols for inventive use.

Corresponding methods are described in, for example, the German laid-open specification 2234265, "hydroxyl-terminal polylactones", of which the applicant is Stamicarbon N.V.

The dimer fatty acids and the compounds of the formula (II) are used here preferably in a molar ratio of 0.7/2.3 to 1.3/1.7. In this embodiment, the resulting reaction product preferably possesses a number-average molecular weight of 1200 to 5000 g/mol, more preferably 1200 to 4500 g/mol, and very preferably 1200 to 4000 g/mol. These reaction products are described in European patent application EP13197872.8, which is not a prior publication.

Other preferred compounds (b3) are dimer diols or are present in dimer diols. Dimer diols are long-established and are also referred to in the scientific literature as dimeric fatty alcohols. They are mixtures prepared, for example, by oligomerization of unsaturated fatty acids or their esters and by subsequent hydrogenation of the acid groups or ester groups, or by oligomerization of unsaturated fatty alcohols. Starting materials used may be unsaturated C12 to C22 fatty acids or their esters, or unsaturated C12 to C22 fatty alcohols. The hydrocarbon radicals which connect the hydroxyl groups in the dimer diols are defined like the hydrocarbon radicals which separate the carboxyl groups in the dimer fatty acids.

Thus, for example, DE 11 98 348 describes their preparation by dimerization of unsaturated fatty alcohols with basic alkaline earth metal compounds at more than 280° C.

They may also be prepared by hydrogenation of dimer fatty acids as described above, and/or their esters, in accordance with German published specification DE-B-17 68 313. Under the conditions described therein, not only are the carboxyl groups of the fatty acids hydrogenated to hydroxyl groups, but also any double bonds possibly still present in the dimer fatty acids and/or their esters are partly or fully hydrogenated. It is also possible, however, to carry out the hydrogenation in such a way that the double bonds are completely retained during the hydrogenation. In this case, unsaturated dimer diols are obtained. The hydrogenation is preferably carried out in such a way that the double bonds are as far as possible completely hydrogenated.

One other possibility for the preparation of dimer diols is the dimerization of unsaturated alcohols in the presence of siliceous earth/alumina catalysts and of basic alkali metal compounds, in accordance with International application WO 91/13918.

Independently of the methods described for the preparation of the dimer diols, preference is given to using dimer diols (b3) which have been prepared from $C_{18}$ fatty acids or their esters and/or from $C_{18}$ fatty alcohols. In this way, dimer diols with 36 carbon atoms are predominantly formed.

Dimer diols produced in accordance with the industrial methods specified above always include varying amounts of trimer triols and of monofunctional alcohols. Generally speaking, the fraction of dimeric molecules is above 70 wt %, and the remainder is trimeric molecules and monomeric molecules. For the purposes of the invention, it is possible to use both these dimer diols, and also purer dimer dials with more than 90 wt % of dimeric molecules. Especially preferred are dimer diols with more than 90 to 99 wt % of dimeric molecules, and of these, in turn, preference is given to those dimer diols whose double bonds and/or aromatic radicals are at least partly or completely hydrogenated. An alternative expression for the relevant term "dimer diols" is therefore "mixture comprising dimers preparable by dimerization of fatty alcohols". Through the use of dimer dials, therefore, the use of difunctional compounds (b) is automatically realized. This also justifies the statement, selected in the context of the present invention, that dimer diols are used as compound (b3). The reason is that difunctional compounds (b) are apparently the main constituent of the mixtures identified as dimer dials. If, therefore, dimer dials are used as compounds (b3), this means that these compounds (b3) are employed in the form of corresponding mixtures with—as described above—monomeric and/or trimeric molecules and/or other byproducts.

The average hydroxy functionality of the dimer diols ought preferably to be 1.8 to 2.2.

In the sense of the present invention, therefore, particular preference is given to using dimer dials which are preparable by hydrogenation from the dimer fatty acids described above. Especially preferred are those dimer diols which consist to an extent of ≥90 wt % of dimeric molecules, ≤5 wt % of trimeric molecules, and ≤5 wt % of monomeric molecules and other byproducts, and/or have a hydroxyl functionality of 1.8 to 2.2. Particular preference attaches to using those dials which are preparable by hydrogenation of dimer fatty acids which consist to an extent of 95 to 98 wt % of dimeric molecules, less than 5 wt % of trimeric molecules, and less than 1 wt % of monomeric molecules and other byproducts. Likewise particularly preferred is the use of diols preparable by hydrogenation from dimer fatty acids consisting of ≥98 wt % of dimeric molecules, ≤1.5 wt % of trimeric molecules, and ≤0.5 wt % of monomeric molecules and other byproducts.

As already described above, depending on reaction regime, dimer fatty acids which can be used for preparing the dimer diols have both aliphatic and also, optionally, aromatic molecular fragments. The aliphatic molecular fragments can be subdivided further into linear and cyclic fragments, which may in turn be saturated or unsaturated. As a result of a hydrogenation, the aromatic and also the unsaturated aliphatic molecular fragments may be converted into corresponding saturated aliphatic molecular fragments. The dimer diols that may be employed can accordingly be saturated or unsaturated. The dimer diols are preferably aliphatic, more particularly aliphatic and saturated.

Preference in the sense of the present invention is given to using dimer diols which can be prepared by hydrogenation of the carboxylic acid groups of preferably saturated aliphatic dimer fatty acids.

Particularly preferred diols are those preparable by hydrogenation from dimer fatty acids which consist to an extent of ≥98 wt % of dimeric molecules, ≤1.5 wt % of trimeric molecules, and ≤0.5 wt % of monomeric molecules and other byproducts.

The dimer diols with particular preference possess a hydroxyl number of 170 to 215 mg KOH/g, very preferably of 195 to 212 mg KOH/g, and more particularly 200 to 210 mg KOH/g, determined by means of DIN ISO 4629. The dimer diols very preferably possess a viscosity of 1500 to 5000 mPas, especially preferably 1800 to 2800 mPas (25° C., Brookfield, ISO 2555).

Dimer diols whose use is especially preferred are the commercial products Pripol® 2030 and more particularly Pripol® 2033 from Uniqema, or Sovermol® 908 from BASF.

The dimer fatty acids and the dimer dials (b3) are used preferably here in a molar ratio of 0.7/2.3 to 1.3/1.7, more particularly of 0.9/2.1 to 1.1/1.9. The reaction product possesses generally a number-average molecular weight of 1200 to 5000 g/mol, more particularly of 1300 to 4500 g/mol.

The coating material composition comprises the reaction product (RP) typically in an amount of 0.05 to 10.0 wt %, preferably of 0.1 to 8.0 wt %, more preferably in an amount of 0.2 to 6.0 wt %, based in each case on the binder fraction of the coating material composition (in other words based in each case on the sum of the binder fraction of component (A) plus the binder fraction of component (B) plus the binder fraction of component (C) plus the binder fraction of component (RP) plus the binder fraction of component (E)).

Catalyst (D)

The coating material composition may further comprise a customary catalyst. Catalysts useful for the reaction between the hydroxyl groups of components (A), (RP), and optionally (C), and the free isocyanate groups of component (B), are compounds that are known per se. Examples are Lewis acids (electron-deficient compounds), such as tin naphthenate, tin benzoate, tin octoate, tin butyrate, dibutyltin dilaurate, dibutyltin diacetate, dibutyltin oxide, for example, and also catalysts as described in WO-A-2006/042585.

Acid catalysts as well may be used as catalyst (D). The acid catalysts (D) are preferably organic acids, more particularly sulfonic acids, carboxylic acids, phosphoric acids and/or acidic phosphoric esters, more particularly sulfonic acids. The stated acid catalysts are employed preferably in a blocked form. As a result, as is known, for example, the shelf life of the compositions comprising the catalysts is improved. Examples of suitable blocking agents are amines such as, preferably, tertiary-alkylated or heterocyclic amines. Examples of suitable sulfonic acids include dodecylbenzenesulfonic acid (DDBSA), dinonylnaphtha-lene-disulfonic acid (DNNSA), para-toluenesulfonic acid (pTSA), and also blocked sulfonic acid catalysts such as blocked DDBSA, blocked DNNSA, or blocked p-TSA. This blocking of the sulfonic acid catalysts is accomplished for example likewise via amines such as preferably tertiary-alkylated or heterocyclic amines, such as 2-amino-2-methylpropanol, diisopropanolamine, dimethyl-oxazolidine, or trimethylamine, for example. Also possible is the use of covalent-blocked sulfonic acid catalysts. In this case, blocking takes place using covalent-bonding blocking agents such as, for example, epoxy compounds or epoxy-isocyanate compounds. Blocked sulfonic acid catalysts of these kinds are described in detail in the patent publication U.S. Pat. No. 5,102,961. Amine-blocked sulfonic acid catalysts are preferably used. Such catalysts are available, for example, under the trade name CYCAT® (from Cytec) or else Nacure® (from King Industries), and can be employed directly in the clearcoat coating composition of the invention.

Other suitable catalysts (D) include amidines and their derivatives, especially derivatives based on a zinc-amidine complex which is preparable by reaction of one or more zinc(II) biscarboxylates with one or more amidines. Amidines of this kind and their derivatives are described in WO 2012/123166, in WO 2012/123161, and in WO 2012/123198, for example. Also suitable, furthermore, as catalysts are the imidazoles and derivatives thereof that are specified in WO 2012/126796 and in WO 2013/110712.

The catalysts are employed preferably in proportions of 0.01 to 20 wt %, more preferably in proportions of 0.1 to 10 wt %, based on the binder fraction of the coating material composition (that is, based in each case on the solids arising from polyacrylate, polyester, and crosslinkers, i.e., therefore based in each case on the sum of the binder fraction of component (A) plus the binder fraction of component (B) plus the binder fraction of component (C) plus the binder fraction of component (RP) plus the binder fraction of component (E)).

The Combination of Components (A), (B), Optionally (C), and (RP), and Also Further Components of the Coating Material Compositions Where the coating material compositions are one-component compositions, then polyisocyanate group-containing components (B) are selected whose free isocyanate groups are blocked with blocking agents. The isocyanate groups may be blocked, for example, with substituted pyrazoles, more particularly with alkyl-substituted pyrazoles, such as 3-methylpyrazole, 3,5-dimethylpyrazole, 4-nitro-3,5-dimethylpyrazole, 4-bromo-3,5-dimethylpyrazole, and the like. With particular preference the isocyanate groups of component (B) are blocked with 3,5-dimethylpyrazole.

The two-component (2K) coating material compositions that are particularly preferred in accordance with the invention are formed by the mixing, in a conventional way shortly before the coating material is applied, of a paint component comprising the polyhydroxyl group-containing component (A) and also further components, described below, with a further paint component comprising the polyisocyanate group-containing component (B) and also, optionally, further of the components described below, with the paint component comprising component (A) generally comprising the reaction product (RP) and also a part of the solvent.

The polyhydroxyl component (A) may be present in a suitable solvent. Suitable solvents are those which permit sufficient solubility of the polyhydroxyl component.

Examples of such solvents are those solvents (L) already listed for the polyisocyanate group-containing component (B).

The weight fractions of the polyol (A) and optionally (C) and of the reaction product (RP) and also of the polyisocyanate (B) are preferably selected such that the molar equivalents ratio of the hydroxyl groups of the polyhydroxyl group-containing component (A) plus optionally (C) plus (RP) to the isocyanate groups of component (B) is between 1:0.9 and 1:1.5, preferably between 1:0.9 and 1:1.1, more preferably between 1:0.95 and 1:1.05.

It is preferred in accordance with the invention for coating material compositions to be used that comprise from 30 to 75 wt %, preferably from 40 to 65 wt %, based in each case on the binder fraction of the coating material composition, of at least one polyhydroxyl group-containing component (A), more particularly of at least one polyhydroxyl group-containing polyacrylate (A) and/or of at least one polyhydroxyl group-containing polymethacrylate (A).

Likewise preferred is the use in accordance with the invention of coating material compositions which comprise from 20 to 50 wt %, preferably from 25 to 40 wt %, based in each case on the binder fraction of the coating material composition, of the polyisocyanate group-containing component (B).

Besides these, the coating materials of the invention may further comprise one or more amino resins (E). Those contemplated are the customary and known amino resins, some of whose methylol and/or methoxymethyl groups may have been defunctionalized by means of carbamate groups or allophanate groups. Crosslinking agents of this kind are described in patent specifications U.S. Pat. No. 4,710,542 and EP-B-0 245 700, and also in the B. Singh and coworkers article "Carbamylmethylated Melamines, Novel Cross-linkers for the Coatings Industry" in Advanced Organic Coatings Science and Technology Series, 1991, volume 13, pages 193 to 207. Generally speaking, such amino resins (E) are used in proportions of 0 to 20 wt %, preferably of 3 to 15 wt %, based on the binder fraction of the coating material composition.

The coating material compositions of the invention preferably further comprise at least one customary and known coatings additive (F), different from components (A), (B), (D), optionally (C), optionally (E), and (RP), in effective amounts, i.e., in amounts preferably up to 20 wt %, more preferably from 0 to 10 wt %, based in each case on the binder fraction of the coating material composition.

Examples of suitable coatings additives (F) are as follows:
especially UV absorbers;
especially light stabilizers such as HALS compounds, benzotriazoles, or oxalanilides;
radical scavengers;
slip additives;
polymerization inhibitors;
defoamers;
reactive diluents different from components (A) and (C), more particularly reactive diluents which become reactive only on reaction with further constituents and/or water, such as Incozol or aspartic esters, for example;
wetting agents different from components (A) and (C), such as siloxanes, fluorine compounds, carboxylic monoesters, phosphoric esters, polyacrylic acids and copolymers thereof, or polyurethanes;
adhesion promoters;
flow control agents;
rheological assistants, based for example on customary hydrophilic and/or hydrophobic fumed silica, such as various Aerosil® grades, or customary urea-based rheological assistants;
film-forming auxiliaries such as cellulose derivatives;
fillers such as, for example, nanoparticles based on silicon dioxide, aluminum oxide, or zirconium oxide; for further details, refer to Römpp Lexikon "Lacke and Druckfarben", Georg Thieme Verlag, Stuttgart, 1998, pages 250 to 252;
flame retardants.

Particularly preferred are coating material compositions which comprise
40 to 65 wt %, based on the binder fraction of the coating material composition, of at least one polyhydroxyl group-containing polyacrylate (A) and/or of at least one polyhydroxyl group-containing polymethacrylate (A) and/or of at least one polyhydroxyl group-containing polyester polyol (A) different from the component (RP) and/or of a polyhydroxyl group-containing polyurethane (A),
25 to 40 wt %, based on the binder fraction of the coating material composition, of at least one component (B),
0 to 5 wt %, based on the binder fraction of the coating material composition, of the hydroxyl group-containing component (C),
0.1 to 8.0 wt %, based on the binder fraction of the coating material composition of the invention, of at least one reaction product (RP),
3 up to 15 wt %, based on the binder fraction of the coating material composition, of at least one amino resin (E),
0.1 to 10 wt %, based on the binder fraction of the coating material composition of the invention, of at least one catalyst (D) for the crosslinking, and
0 to 10 wt %, based on the binder fraction of the coating material composition, of at least one customary and known coatings additive (F).

The binder fraction of the coating material composition as indicated in the context of the amounts of the individual components is made up in each case of the sum of the binder fraction of component (A) plus the binder fraction of component (B) plus the binder fraction of component (C) plus the binder fraction of component (RP) plus the binder fraction of component (E).

The coating materials of the invention are more particularly transparent coating materials, preferably clearcoats. The coating materials of the invention therefore comprise no pigments, or only organic transparent dyes or transparent pigments.

In a further embodiment of the invention, the binder mixture of the invention or the coating material composition of the invention may further comprise additional pigments and/or fillers and may serve for the production of pigmented topcoats or pigmented undercoats or surfacers, more particularly pigmented topcoats. The pigments and/or fillers employed for these purposes are known to the skilled person. The pigments are typically used in an amount such that the pigment-to-binder ratio is between 0.05:1 and 1.5:1, based in each case on the binder fraction of the coating material composition.

Since the coatings of the invention produced from the coating materials of the invention adhere outstandingly even to already-cured electrocoats, primer-surfacer coats, basecoats or customary and known clearcoats, they are outstandingly suitable, in addition to their use in automotive OEM (production-line) finishing, for automotive refinishing and/or for the coating of parts for installation in or on motor vehicles, and/or for the coating of commercial vehicles.

The application of the coating material compositions of the invention may take place by any of the customary application methods, such as, for example, spraying, knife-coating, spreading, pouring, dipping, impregnating, trickling or rolling. With respect to such application, the substrate to be coated may itself be at rest, with the application unit or equipment being moved. Alternatively, the substrate to be coated, more particularly a coil, may be moved, with the application unit being at rest relative to the substrate or being moved appropriately.

Preference is given to employing spray application methods, such as, for example, compressed air spraying, airless spraying, high speed rotation, electrostatic spray application (ESTA), alone or in conjunction with hot spray application such as hot air spraying, for example.

The curing of the applied coating materials of the invention may take place after a certain rest time. The rest time serves, for example, for the leveling and degassing of the coating films or for the evaporation of volatile constituents such as solvents. The rest time may be assisted and/or shortened through the application of elevated temperatures and/or through a reduced atmospheric humidity, provided that this does not entail any instances of damage to or change in the coating films, such as a premature complete cross-linking.

The thermal curing of the coating materials has no peculiarities in terms of method, but instead takes place in accordance with the customary and known methods, such as heating in a forced air oven or irradiation with IR lamps. This thermal curing may also take place in stages. Another preferred curing method is that of curing with near infrared (NIR radiation).

The thermal curing takes place advantageously at a temperature of 20 to 200° C., preferably 40 to 190° C. and more particularly 50 to 180° C., for a time of 1 min up to 10 h, preferably 2 min to 5 h and more particularly 3 min to 3 h, with longer cure times also being employable at low temperatures. For automotive refinishing and for the coating of plastics parts, and also for the coating of commercial vehicles, relatively low temperatures are typically employed here, of preferably between 20 and 80° C., more particularly between 20 and 60° C.

The coating materials of the invention are outstandingly suitable as decorative, protective and/or effect coatings and finishes on bodywork of means of transport (especially powered vehicles, such as cycles, motorcycles, buses, trucks or cars) or of parts thereof; on the interior and exterior of edifices; on furniture, windows and doors; on plastics moldings, especially CDs and windows; on small industrial parts, on coils, containers and packaging; on white goods; on films; on optical, electrical and mechanical components; and also on hollow glassware and articles of everyday use.

The coating material compositions of the invention can therefore be applied, for example, to an uncoated or precoated substrate, the coating materials of the invention being either pigmented or unpigmented. The coating material compositions and paint systems of the invention in particular, more particularly the clearcoats, are employed in the technologically and esthetically particularly demanding field of automotive OEM finishing and for the coating of plastics parts for installation in or on car bodies, more particularly for top-class car bodies, such as, for example, for producing roofs, hatches, hoods, fenders, bumpers, spoilers, sills, protective strips, side trim and the like, and for the finishing of commercial vehicles, such as, for example, of trucks, chain-driven construction vehicles, such as crane vehicles, wheel loaders and concrete mixers, buses, rail vehicles, watercraft, aircraft, and also agricultural equipment such as tractors and combines, and parts thereof, and also for automotive refinishing, with automotive refinishing encompassing not only the repair of the OEM finish on the line but also the repair of local defects, such as scratches, stone chip damage and the like, for example, and also complete recoating in corresponding repair workshops and car paint shops for the value enhancement of vehicles.

The plastics parts are typically composed of ASA, polycarbonates, blends of ASA and polycarbonates, polypropylene, polymethyl methacrylates or impact-modified polymethyl methacrylates, more particularly of blends of ASA and polycarbonates, preferably used with a polycarbonate fraction >40%, more particularly >50%.

ASA refers generally to impact-modified styrene/acrylonitrile polymers, in which graft copolymers of vinylaromatic compounds, more particularly styrene and of vinyl cyanides, more particularly acrylonitrile, are present on polyalkyl acrylate rubbers in a copolymer matrix of, in particular, styrene and acrylonitrile.

With particular preference, the coating material compositions of the invention are used in multistage coating processes, more particularly in processes in which an optionally precoated substrate is coated first with a pigmented basecoat film and then with a film with the coating material composition of the invention. The invention accordingly also provides multicoat color and/or effect finishes comprising at least one pigmented basecoat and at least one clearcoat applied thereon, these finishes being characterized in that the clearcoat has been produced from the coating material composition of the invention.

Not only water-thinnable basecoats but also basecoats based on organic solvents can be used. Suitable basecoats are described in, for example, EP-A-0 692 007 and in the documents listed therein at column 3 lines et seq. Preferably, the applied basecoat is first dried—that is, in an evaporation phase, at least some of the organic solvent and/or of the water is removed from the basecoat film. Drying takes place preferably at temperatures from room temperature to 80° C. After drying has taken place, the coating material composition of the invention is applied. The two-coat finish is subsequently baked, preferably under conditions employed in automotive OEM finishing, at temperatures from 20 to 200° C. for a time of 1 min up to 10 h; in the case of the temperatures employed for automotive refinishing, which in general are between 20 and 80° C., more particularly between 20 and 60° C., longer cure times may also be employed.

In another preferred embodiment of the invention, the coating material composition of the invention is used as a transparent clearcoat for the coating of plastics substrates, particularly of plastics parts for interior or exterior installation. These plastics parts for interior or exterior installation are preferably coated likewise in a multistage coating process, in which an optionally precoated substrate or a substrate which has been pretreated for enhanced adhesion of the subsequent coatings (by means, for example, of flaming, corona treatment or plasma treatment of the substrate) is coated first with a pigmented basecoat film and thereafter with a film with the coating material composition of the invention.

EXAMPLES

Preparation of a Polyacrylate Polyol (A1)

A reactor flushed with nitrogen and attached to a condenser is charged with 589.25 parts by weight of Solventnaphta®, and this initial charge is heated to 140° C. with stirring. In parallel to this, two separate feeds were prepared. Feed 1 consisted of 340.75 parts by weight of cyclohexyl methacrylate, 262.00 parts by weight of styrene, 209.25 parts by weight of n-butyl methacrylate, 235.75 parts by weight of 2-hydroxyethyl methacrylate, and 262.00 parts by weight of hydroxypropyl methacrylate. Feed 2 consisted of 61.00 parts by weight of Solventnaphta® and 130.75 parts by weight of peroxide TBPEH (tert-butyl peroxy-2-ethylhexanoate). When the temperature of 140° C. was reached, feed 2 was metered in slowly and at a uniform rate over a period of 285 minutes. 15 minutes after the start of feed 2, feed 1 was metered into the reactor slowly at a uniform rate over a period of 240 minutes. After the end of the metering of feed 2, the reaction mixture was stirred at 140° C. for a further 120 minutes for postpolymerization. The polymerization solution is diluted with 409.25 g of methoxypropyl acetate. The binder fraction of the resultant product was found to be 55.15%, the acid number 1.5 mg KOH/g (based on the solids), and the viscosity (at 23° C.) 650 mPa s. The theoretical OH number is 156 mg KOH/g.

Preparation of a Polyacrylate Polyol (A2)

A reactor flushed with nitrogen and attached to a condenser is charged with 678.22 parts by weight of Solventnaphta®, and this initial charge is heated to 140° C. with stirring. In parallel to this, two separate feeds were prepared. Feed 1 consisted of 335.73 parts by weight of cyclohexyl methacrylate, 258.28 parts by weight of styrene, 193.25 parts by weight of n-butyl methacrylate, 232.38 parts by weight of 2-hydroxyethyl methacrylate, 12.83 parts by weight of acrylic acid and 258.28 parts by weight of hydroxypropyl methacrylate. Feed 2 consisted of 58.33 parts by weight of Solventnaphta® and 129.03 parts by weight of peroxide TBPEH (tert-butyl peroxy-2-ethylhexanoate). When the temperature of 140° C. was reached, feed 2 was metered in slowly and at a uniform rate over a period of 285 minutes. 15 minutes after the start of feed 2, feed 1 was metered into the reactor slowly at a uniform rate over a period of 240 minutes. After the end of the metering of feed 2, the reaction mixture was stirred at 140° C. for a further 120 minutes for postpolymerization. The polymerization solution is diluted with a mixture of 146.60 g of butyl acetate and 196.70 g of solvent naphtha. The binder fraction of the resultant product was found to be 55.10%, the acid number 9.6 mg KOH/g (based on the solids), and the viscosity (at 23° C.) 1120 mPa s. The theoretical OH number is 156 mg KOH/g.

Preparation of the Aerosil Paste (A3)

A laboratory agitator mill from Vollrath is charged with 800 g of mill base consisting of 656 g of the polyacrylate A2, 74.4 g of butyl acetate, and 69.6 g of Aerosil® R380 (Evonik Industries AG, Hanau—BET surface area=380±30 m2/g), together with 110 g of vitreous silica (grain size 0.7±01 mm), and grinding took place for 30 minutes with water cooling. The product was then separated from the grinding media.

Preparation of a Reaction Product (R1)

As described in example BE1 of International patent application PCT/EP2013/067742, the reaction product (R1) is prepared as follows: a 4 l stainless steel reactor, equipped with anchor stirrer, thermometer, condenser, thermometer for overhead temperature measurement, and water separator, was used to heat 2 mol of PolyTHF® 1000 from BASF SE, 579.3 g of dimer fatty acid (1 mol), and 51 g of cyclohexane to 100° C. in the presence of 2.1 g of di-n-butyltin oxide (Axion® CS 2455, Chemtura). Heating was slowly continued until condensation began. Heating was then continued further in stages to 220° C., with a maximum overhead temperature of 85° C. The progress of the reaction was monitored via determination of the acid number. When an acid number of ≤3 mg KOH/g had been reached, cyclohexane still present was removed by vacuum distillation. This gave a viscous resin.

Condensate quantity (water): 34.9 g

Acid number: 2.7 mg KOH/g

Solids content (60 min at 130° C.): 100.0%

Molecular weight (calibration: PMMA standards):

Mn: 3900 g/mol

Mw: 7200 g/mol

Viscosity: 5549 mPas (measured at 23° C. using a Brookfield rotary viscometer, model CAP 2000+, spindle 3, shear rate: 1333 s-1)

Formulation of the Coating Materials of Inventive Examples B1 to B5 and the Coating Material of Comparative Example V1 and Also the Corresponding Coatings of Examples 1 to 5 and of Comparative Example V1

To prepare the mill bases (S2), (S3), (S4), (S5), and (S6) of the inventive examples, and the mill base (S1) of the comparative example, the constituents indicated in table 1 are weighed out in the stated order (beginning from the top) into a suitable vessel, in this order, and are intimately stirred together with one another.

TABLE 1

Composition of the mill bases S1 to S6 in parts by weight

| Component | Parts by weight mill base (S1) | Parts by weight mill base (S2) | Parts by weight mill base (S3) | Parts by weight mill base (S4) | Parts by weight mill base (S5) | Parts by weight mill base (S6) |
|---|---|---|---|---|---|---|
| Polyacrylate polyol (A1) | 35 | 35 | 35 | 35 | 35 | 35 |
| Polyacrylate polyol (A2) | 26 | 26 | 26 | 26 | 26 | 26 |
| Setalux ® 91756[1] rheological agent | 13 | 13 | 13 | 13 | 13 | 13 |
| Paste A3[2] | 2 | 2 | 2 | 2 | 2 | 2 |
| Cymel ® 202[3] | 8 | 8 | 8 | 8 | 8 | 8 |
| TINUVIN ® 384[4] | 1.1 | 1.1 | 1.1 | 1.1 | 1.1 | 1.1 |

TABLE 1-continued

Composition of the mill bases S1 to S6 in parts by weight

| Component | Parts by weight mill base (S1) | Parts by weight mill base (S2) | Parts by weight mill base (S3) | Parts by weight mill base (S4) | Parts by weight mill base (S5) | Parts by weight mill base (S6) |
|---|---|---|---|---|---|---|
| TINUVIN ® 292[5)] | 0.9 | 0.9 | 0.9 | 0.9 | 0.9 | 0.9 |
| BYK ® 325[6)] | 0.15 | 0.15 | 0.15 | 0.15 | 0.15 | 0.15 |
| Butyl acetate | 3.65 | 3.65 | 3.65 | 3.65 | 3.65 | 3.65 |
| Dipropylene glycol methyl ether | 7 | 7 | 7 | 7 | 7 | 7 |
| Butanol | 1 | 1 | 1 | 1 | 1 | 1 |
| Solventnaphta ® | 2.2 | 2.2 | 2.2 | 2.2 | 2.2 | 2.2 |
| Reaction product (R1) | 0 | 0.25 | 0.50 | 1.00 | 2.00 | 4.00 |
| Fraction of R1 in diluted mill base in wt % | 0.00 | 0.2 | 0.5 | 1.0 | 2.0 | 3.8 |
| Fraction of R1 in mill base, based on binder fraction, in wt %[7)] | 0.00 | 0.5 | 0.9 | 1.9 | 3.8 | 7.4 |
| Fraction of R1 in total paint, based on binder fraction, in wt %[8)] | 0.00 | 0.3 | 0.6 | 1.3 | 2.5 | 4.9 |

Key to Table 1:
[1)]Setalux ® 91756 = commercial rheological agent from Nuplex Resins, The Netherlands, based on urea, in solution or dispersion in a polyacrylate binder, with a nonvolatile fraction of 60 wt %
[2)]above-described paste A3 of Aerosil ®
[3)]Cymel ® 202 = commercial melamine resin from Cytec, 82% in butanol.
[4)]Tinuvin ® 384 = commercial light stabilizer based on a benzotriazole, from BASF SE
[5)]Byk ® 292 = commercial light stabilizer based on a sterically hindered amine, from BASF SE
[6)]Byk ® 325 = commercial, polyether-modified polymethyl-alkylsiloxane from Byk Chemie
[7)]Fraction of reaction product R1 in wt % in the respective mill base (S1) to (S6), based in each case on the binder fraction of the respective mill base
[8)]Fraction of reaction product R1 in wt % in the respective total paint (KL1) to (KL6), based in each case on the binder fraction (including crosslinkers) of the respective total paint Curing Solution (B)

For preparing the curing solution, a suitable vessel is charged with 13.5 parts of a commercial isophorone diisocyanate (70% strength in Solventnaphta®), 69.5 parts of a commercial isocyanurate of hexamethylene diisocyanate (90% strength in 1:1 butyl acetate/Solventnaphta®), 8.5 parts of Solventnaphta®, and 8.5 parts of butyl acetate, and these components are intimately stirred with one another.

To produce the coating materials (KL) of inventive examples B1 to B5 and to produce the coating material of comparative example V1, the constituents indicated in Table 2 are weighed out in the order indicated (beginning from the top) into a suitable vessel, in this order, and intimately stirred with one another.

TABLE 2

Composition of the coating materials of examples B1 to B5 and of comparative example V1 in parts by weight (with a mixing ratio of 100 parts by weight of mill base to 36 parts by weight of curing agent)

| | Comp. V1 | B1 | B2 | B3 | B4 | B5 |
|---|---|---|---|---|---|---|
| Mill base (S1) | 100 | | | | | |
| Mill base (S2) | | 100 | | | | |
| Mill base (S3) | | | 100 | | | |
| Mill base (S4) | | | | 100 | | |
| Mill base (S5) | | | | | 100 | |
| Mill base (S6) | | | | | | 100 |
| Curing solution (B) | 36 | 36 | 36 | 36 | 36 | 36 |

Bonder panels of metal are coated in succession with a commercial electrocoat (CathoGuard® 500 from BASF Coatings GmbH) and with a commercial water-based primer-surfacer (SecuBloc® from BASF Coatings GmbH), with each of the applied coatings being baked. Thereafter, a coating of commercial black waterborne paint (ColorBrite® from BASF Coatings GmbH) is applied, and drying takes place at 80° C. for 7 minutes. The resulting coating materials of examples B1 to B5 and of comparative example V1 are subsequently applied using a gravity-fed cup gun, and are baked together with the basecoat material at 135° C. for 20 minutes.

The micropenetration hardness of each of the resultant coatings is determined in accordance with DIN EN ISO 14577-4 DE.

Thereafter, a cross-cut is scored in accordance with the standard DIN EN ISO 2409 DE, and the adhesive tape removal adhesion is tested. The adhesion test is passed when the cross-cut Gt is ≤2. The test results are set out in table 3.

TABLE 3

Test results of the coatings of examples B1 to B5 and of comparative example V1

| | Comp. V1 | B1 | B2 | B3 | B4 | B5 |
|---|---|---|---|---|---|---|
| Cross-cut[1)] | Gt 5 | Gt 1 | Gt 0 | Gt 0 | Gt 1-2 | Gt 2 |
| Hardness[2)] | 170 | 158 | 150 | 150 | 127 | 111 |
| Amount of R1 in total paint, based on binder fraction (SC from the polymers), in wt % | 0.00 | 0.3 | 0.6 | 1.3 | 2.5 | 4.9 |

Key to Table 3:
[1)]The adhesion was tested using the cross-cut method in accordance with the DIN EN ISO 2409 DE standard, with adhesive tape removal.
[2)]The hardness was tested by micropenetration hardness in accordance with standard DIN EN ISO 14577-4 DE.

Discussion of the Test Results:

A comparison between inventive examples B1 to B5 and comparative example V1 shows that the addition of the reaction product R1 in accordance with the invention significantly improves the adhesion of the coatings. With increasing fraction of reaction product R1, though, the hardness of the coatings reduces.

The invention claimed is:

1. A nonaqueous coating material composition, comprising:
   (A) at least one polyhydroxyl group-containing component (A); and
   (B) at least one polyisocyanate group-containing component (B),
   wherein
   the coating material composition comprises at least one hydroxy-functional reaction product (RP) other than component (A), said product (RP)
      (i) possessing an acid number <20 mg KOH/g, and
      (ii) being prepared by reaction of at least one dimer fatty acid (a) with at least one aliphatic, araliphatic, or aromatic dihydroxy-functional compound (b), wherein
         the dimer fatty acid (a) consists of at least 90 wt % of dimeric molecules, less than 5 wt % of trimeric molecules, and less than 5 wt % of monomeric molecules and other byproducts,
         the dihydroxy-functional compound (b) has a number-average molecular weight of 120 to 6000 g/mol, and
         the coating material composition comprises the reaction product (RP) in an amount of 0.05 to 10.0 wt %, based on a binder fraction of the coating material composition.

2. The coating material composition of claim 1, wherein the at least one compound (b) is at least one selected from the group consisting of
   (1) at least one polyether diol (b1) of the general structural formula (I):

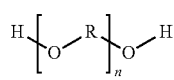
   (I)

where R is a $C_3$ to $C_6$ alkylene radical and n correspondingly is selected such that the polyether (b1) possesses a number-average molecular weight of 120 to 6000 g/mol,
   (2) at least one polyester diol (b2) of the general structural formula (II)

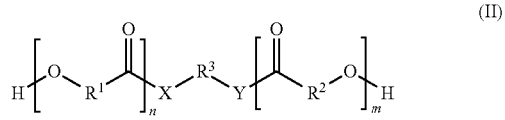
   (II)

where
   $R^3$ is a divalent organic radical comprising 2 to 10 carbon atoms,
   $R^1$ and $R^2$ independently of one another are straight-chain or branched alkylene radicals having 2 to 10 carbon atoms,
   X and Y independently of one another are O, S, or $NR^4$, in which $R^4$ is hydrogen or an alkyl radical having 1 to 6 carbon atoms, and
   m and n correspondingly are selected such that the polyester diol (b2) possesses a number-average molecular weight of 450 to 2200 g/mol, and
   (3) at least one dimer diol (b3).

3. The coating material composition of claim 1, wherein the dimer fatty acid (a) is prepared from linolenic, linoleic and/or oleic acid and/or consists of at least 98 wt % of dimeric molecules, less than 1.5 wt % of trimeric molecules, and less than 0.5 wt % of monomeric molecules and other byproducts and possesses an iodine number of ≤10 g/100 g.

4. The coating material composition of claim 1, wherein the reaction product (RP) has a number-average molecular weight of 600 to 40,000 g/mol, and/or the reaction product (RP) has an acid number <10 mg KOH/g, and/or components (a) and (b) are used in a molar ratio of 0.7/2.3 to 1.6/1.7.

5. The coating material composition of claim 1, wherein the coating material composition comprises at least one reaction product (RP) prepared by reaction of at least one dimer fatty acid (a) with at least one polyether diol (b1) of the general structural formula (I), the group R in the general structural formula (I) comprising propylene radicals or isopropylene radicals or tetramethylene radicals.

6. The coating material composition of claim 1, wherein the coating material composition comprises at least one reaction product (RP) which possesses a number-average molecular weight of 1500 to 5000 g/mol and which is prepared by reaction of at least one dimer fatty acid (a) with at least one polyether diol (b1) of the general structural formula (I), the polyether diol (b1) possessing a number-average molecular weight of 450 to 2200 g/mol, and components (a) and (b1) being used in a molar ratio of 0.7/2.3 to 1.3/1.7.

7. The coating material composition of claim 1, wherein the coating material composition comprises at least one reaction product (RP) which possesses a number-average molecular weight of 2500 to 4000 g/mol and an acid number <5 mg KOH/g and which is prepared by reaction of at least one dimer fatty acid (a) with at least one polyether diol (b1) of the general structural formula (I), the polyether diol (b1) possessing a number-average molecular weight of 800 to 1200 g/mol, and components (a) and (b1) being used in a molar ratio of 0.9/2.1 to 1.1/1.9.

8. The coating material composition of claim 1, wherein the coating material composition comprises at least one reaction product (RP) prepared by reaction of at least one dimer fatty acid (a) with at least one polyether diol (b1) of the general structural formula (I), the polyether diol (b1) possessing a number-average molecular weight of 2250 to 6000 g/mol, components (a) and (b1) being used in a molar ratio of 0.7/2.3 to 1.6/1.7, and the reaction product (RP) possessing a number-average molecular weight of 4800 to 40,000 g/mol.

9. The coating material composition of claim 1, wherein the coating material composition comprises at least one reaction product (RP) prepared by reaction of at least one dimer fatty acid (a) with at least one polyether diol (b1) of the general structural formula (I), the polyether diol (b1) possessing a number-average molecular weight of 120 to 445 g/mol, components (a) and (b1) being used in a molar ratio of 0.7/2.3 to 1.6/1.7, and the reaction product (RP) possessing a number-average molecular weight of 600 to 4000 g/mol.

10. The coating material composition of claim 1, wherein the coating material composition comprises at least one reaction product (RP) prepared by reaction of at least one dimer fatty acid (a) with at least one polyester diol (b2) of the general structural formula (II), the polyester diol (b2) possessing a number-average molecular weight of 450 to 2200 g/mol, components (a) and (b) being used in a molar ratio of 0.7/2.3 to 1.3/1.7, and the resulting dimer fatty acid/polyester dial reaction product possessing a number-average molecular weight of 1200 to 5000 g/mol.

11. The coating material composition of claim 1, wherein the coating material composition comprises at least one reaction product (RP) prepared by reacting at least one dimer fatty acid (a) with at least one dimer diol (b3) which is prepared by (b3a) oligomerization of unsaturated fatty acids or their esters and subsequent hydrogenation of the acid groups or ester groups, or (b3b) by oligomerization of unsaturated fatty alcohols having 12 to 22 carbon atoms, components (a) and (b3) being used in a molar ratio of 0.7/2.3 to 1.3/1.7, and the reaction product (RP) possessing a number-average molecular weight of 1200 to 5000 g/mol.

12. The coating material composition of claim 1, wherein the polyols (A) have an OH number of 30 to 400 mg KOH/g and/or wherein the polyols (A) are selected from the group of polyester polyols, polyurethane polyols, polysiloxane polyols, polyacrylate polyols, and polymethacrylate polyols, all different from the reaction product (RP), or mixtures of these polyols.

13. The coating material composition of claim 1, wherein:
the at least one polyhydroxyl group-containing component (A) is present in an amount of 30 to 75 wt % based on the binder fraction of the coating material composition; and
the at least one polyisocyanate group-containing component (B) is present in an amount of 20 to 50 wt %, based on the binder fraction of the coating material composition.

14. The coating material composition of claim 1, wherein a molar equivalents ratio of the hydroxyl groups of the at least one polyhydroxyl group-containing component (A) and the at least one hydroxyl-functional reaction product (RP) to the isocyanate groups of the at least one polyisocyanate group-containing component (B) is between 1:0.9 and 1:1.5.

15. The coating material composition of claim 1, wherein the at least one hydroxyl-functional reaction product (RP) is present in an amount of 0.1 to 8.0 wt %, based on the binder fraction of the coating material composition.

16. A multistage coating method which comprises applying, to an optionally precoated substrate, a pigmented basecoat film and thereafter a film of the coating material composition of claim 1.

17. The method of claim 16, wherein the optionally precoated substrate is a component of an automobile.

18. A clearcoat, comprising the coating material composition of claim 1.

19. A multicoat effect and/or color paint system, comprising at least one pigmented basecoat film and at least one clearcoat film disposed thereon, wherein the clearcoat film has been produced from a coating material composition of claim 1.

* * * * *

UNITED STATES PATENT AND TRADEMARK OFFICE
CERTIFICATE OF CORRECTION

PATENT NO.       : 10,005,923 B2
APPLICATION NO.  : 15/120273
DATED            : June 26, 2018
INVENTOR(S)      : Guenter Klein et al.

Page 1 of 2

It is certified that error appears in the above-identified patent and that said Letters Patent is hereby corrected as shown below:

In the Specification

In Column 3, Lines 44-45, delete "calorimetry" and insert -- Calorimetry --, therefor.

In Column 13, Line 3, delete "HO-R1-COOH and HO-R2-COOH" and insert -- "HO-$R^1$-COOH and HO-$R^2$-COOH" --.

In Column 14, Line 30, delete "dials" and insert -- diols --, therefor.

In Column 14, Line 39, delete "dials," and insert -- diols, --, therefor.

In Column 14, Line 44, delete "dials." and insert -- diols. --, therefor.

In Column 14, Line 45, delete "dials" and insert -- diols --, therefor.

In Column 14, Line 52, delete "dials" and insert -- diols --, therefor.

In Column 14, Line 59, delete "dials" and insert -- diols --, therefor.

In Column 15, Line 33, delete "dials" and insert -- diols --, therefor.

In Column 20, Line 40, after "lines" insert -- 50 --.

In Column 21, Lines 5-6, delete "Solventnaphta®," and insert -- Solventnaphtha®, --, therefor.

In Column 21, Line 13, delete "Solventnaphta®" and insert -- Solventnaphtha® --, therefor.

In Column 21, Lines 29-30, delete "Solventnaphta®," and insert -- Solventnaphtha®, --, therefor.

In Column 21, Line 38, delete "Solventnaphta®" and insert -- Solventnaphtha® --, therefor.

Signed and Sealed this
Twenty-sixth Day of November, 2019

Andrei Iancu
*Director of the United States Patent and Trademark Office*

CERTIFICATE OF CORRECTION (continued)
U.S. Pat. No. 10,005,923 B2

In Column 23, TABLE 1-continued, Line 12 (approx.), delete "Solventnaphta®" and insert -- Solventnaphtha® --, therefor.

In Column 23, Line 35, delete "Solventnaphta®," and insert -- Solventnaphtha®, --, therefor.

In Column 23, Line 37, delete "Solventnaphta®," and insert -- Solventnaphtha®, --, therefor.

In Column 23, Line 38, delete "Solventnaphta®," and insert -- Solventnaphtha®, --, therefor.

In the Claims

In Column 25, Line 36, Claim 2, delete "dial" and insert -- diol --, therefor.

In Column 27, Line 5, Claim 10, delete "dial" and insert -- diol --, therefor.